April 2, 1957  R. W. LUCE  2,787,238
HYGROMETRIC INDICATOR
Filed April 4, 1955

INVENTOR
Richard W. Luce
BY
ATTORNEYS

United States Patent Office 2,787,238
Patented Apr. 2, 1957

2,787,238

HYGROMETRIC INDICATOR

Richard W. Luce, Southport, Conn.

Application April 4, 1955, Serial No. 498,817

5 Claims. (Cl. 116—114)

This invention relates to hygrometric indicators, and more particularly, to hygrometric indicators that may be used to determine the moisture content of sealed containers and the like.

In shipping or storing such articles as jet engines, machine tools, or other goods which may easily rust, it is often necessary to determine whether the moisture content or relative humidity of the packing cases containing the goods is at a level that might cause rusting. The use of color changing hygrometric indicators to determine the moisture content in sealed containers is in itself old. However, the indicators used heretofore have been difficult to read, so that many times the goods in the sealed containers have been severely damaged or even ruined because the persons checking the indicators were not able to readily determine whether the indicators showed too much moisture in the containers or not. This was because the indicators used had no base or standard color or shade of color to which reference might be readily and easily made to determine if the humidity sensitive indicator had actually changed color.

The hygrometric indicators used before have consisted of plugs containing a piece of paper on which was contained a compound containing cobaltous chloride. Cobaltous chloride in its anhydrous salt form is blue in color, and when it is subjected to relative humidity of a predetermined percent, it will change to a pink color in its hydrated form. This change of color is not striking as the blue and pink colors are of a dull or pale tone so that the change could be thought of as more of a change in shading. The result is that when a complete sheet of paper as used in an old hygometric indicator is coated with this mixture, it is hard to determine exactly when the "break" occurs, that is to say, the exact predetermined point of relative humidity at which the cobaltous chloride changes from its anhydrous blue state to its hydrated pink state. This is true even in indicators having different mixtures of cobaltous chloride where different portions of the coated paper will change at varying degrees of relative humidity. Therefore, it is an object of my invention to provide for a new hygrometric indicator wherein there is a definite contrast of shading and coloring between an anhydrous salt and a salt in its hydrated form which will clearly show the point at which the salt breaks even to one not able to recognize color change other than from a contrast (light-dark) point of view.

It is a further object of my invention to provide for a new indicator which may be easily and economically produced.

Broadly I propose to coat a portion of a piece of paper (a filter or blotter type paper is usually employed) with a compound containing an anhydrous salt, such as cobaltous chloride, which will change to a hydrate salt having a different color at a predetermined degree of relative humidity. I propose further to print an adjacent portion of the paper with an ink, the color or shade of color of which is the same as the color of the salt compound either in its anhydrous form or in its hydrated form. I propose in one form of the invention to print the ink and salt compound on the paper by a half-tone process so that any difference between the colors and shades will be not apparent until after the color break in the salt has occurred as a result of a humidity change.

In still another form of the invention, I propose to print geometrical line patterns on the indicator paper with a printing ink so that the portion or portions of the paper containing the salt compound will be completely surrounded by the printed lines. The remaining portion or portions of the indicator paper are then printed in a color corresponding to the color of the salt compound in either its anhydrous or hydrated state. When a change in relative humidity occurs sufficient to change the color of the salt compound, a geometric pattern becomes discernible which preferably had not been previously discernible or rather had been undiscernible prior to the break in color caused by the humidity change.

I propose also to encase the sheet of paper in a tube in which there is an interior shoulder. The paper is to be protected on one side (normally its color face) by a sheet of glass which rests on a gasket which in turn bears against the interior shoulder of the tube. The other side of the paper (normally its rear face) is to be protected by a second tube having a flanged end in contact with the paper. The complete assembly is held together by having a portion of the first tube crimped over the flange of the second tube so that the complete assembly is airtight as is its seal with a container wall when mounted therein.

Referring to the drawings, in which several embodiments of my new type hygrometric indicator are shown, Fig. 1 shows an enlargement of a piece of indicating paper on which an anhydrous salt compound and a coloring agent are printed by the half-tone process;

The particular anhydrous salt compound used in my new type indicator is not critical. The only requirement is that there be a definite change in color or shade at a predetermined percent of relative humidity. Compounds containing cobaltous chloride are effective, as there is a positive color change of the salt from its blue anhydrous state to its pink hydrated state. Further, the break point or particular percent of relative humidity at which this change takes place can easily be moved by modification of the compound. Further, the most effective paper on which to print this salt compound is filter or blotting paper.

Figure 1:
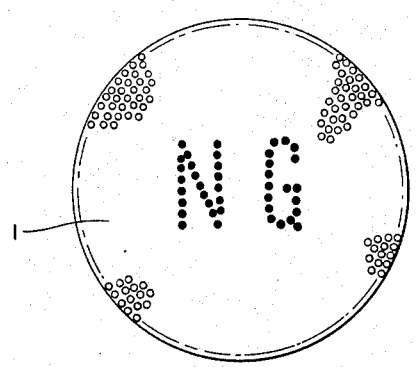

In Fig. 1, I show an enlargement of a piece of paper 1 on which is printed a basic color by the half-tone process. Between the marks of the basic color is also printed by the half-tone process the letters "NG" which is colored in the blue anhydrous form of the cobaltous chloride. The basic background color printed on the paper is made the same shade of blue or the color of the letters so that the letters are normally undiscernible. When the paper comes in contact with air of a predetermined moisture content or percent of relative humidity, the anhydrous salt in the letters will turn to a hydrated form and become pink in color. This will then indicate to an observer that the moisture content of a sealed container to which the indicator is attached has passed from the safe to the danger or NG (no good) point at which the contents of a crate may be damaged. The reading will be clear and distinct because there will now be definite contrast between the coloring or the shading of the letters and of the color of the paper. I have found that by printing the base color on the paper and the anhydrous form of the salt compound on the paper in a half-tone process so that the two do not overlap and, in fact, the unprinted paper separates the colors, the contrast between the two colors when the break occurs is more complete. Also when this process is used, the colors are even more undiscernible before the break occurs. This is so because any glaze effect between the contrasting shades and colors is minimized if not avoided completely.

Figure 2:
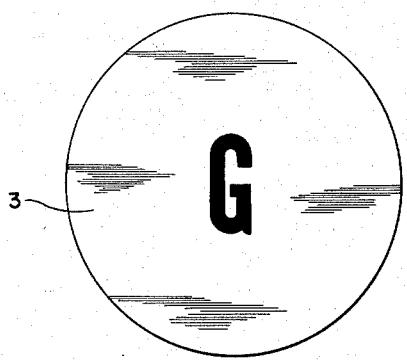
Fig. 2 shows an arrangement of colors and patterns on the indicating paper.

Fig. 2 shows a different combination of contrasting shades of colors and patterns which may be printed on indicator paper to show moisture content in contact with a hygrometric indicator. Here, a sheet of paper 3 is printed with a basic color the same shade as the hydrated form of salt compound with which the letter G is printed. If the compound contains cobaltous chloride as I have used before, this color will be a light pink. It is apparent that if the moisture content of the air in contact with the paper 3 is above a predetermined level or percent of relative humidity, then the letter G will blend in with the background as the salts of which the letter are printed will be in their hydrated state. This will indicate to the observer that the moisture content is above the desirable level. When the moisture content is below the predetermined level, salts in the letter G will take on their anhydrous form so that, in the case of cobaltous chloride, they will be light blue in color. The G will then clearly stand out, indicating to the observer that the moisture content of the air being checked is within the safe or G (good) level.

Figure 3:
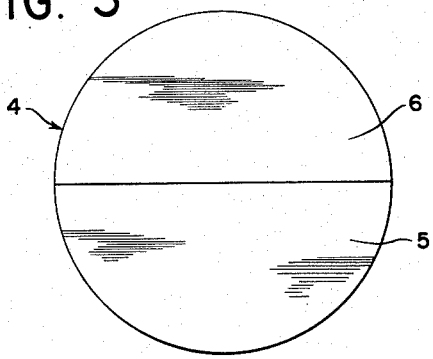
Fig. 3 shows an arrangement of colors opposite that of Fig. 2 and with a different pattern.

Fig. 3 discloses still a further way of combining different shades of colors on a sheet of indicator paper to given a maximum contrast. Here, the sheet of paper 4 may have a portion 5 printed in a color corresponding to the anhydrous form of a salt compound. The upper portion 6 is printed with a compound of the salt, so that when the paper is subjected to air having a moisture content above the predetermined level, the contrast between the colors will be readily apparent.

Figure 4:
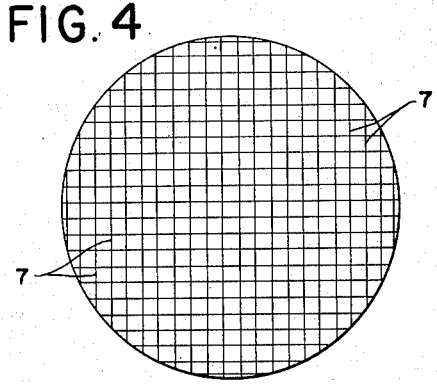
Fig. 4 shows a geometric arrangement of printed lines surrounding portions of indicating paper having an anhydrous salt compound printed thereon.
Figure 5:
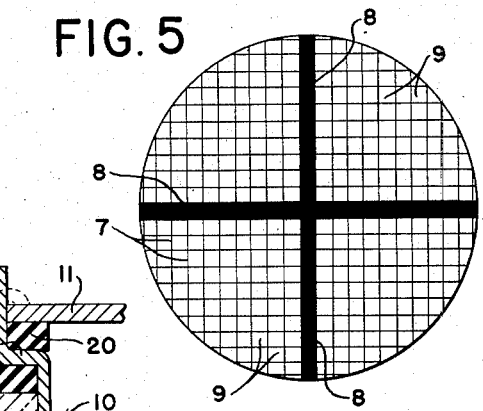
Fig. 5 shows the indicator of Fig. 4 after the color change effected by a change in humidity.

Figs. 4 and 5 show a sheet of indicator paper having printed thereon a series of intersecting black lines 7 which form squares on the paper. A series of squares 8 which form a definite pattern such as a cross may be printed with anhydrous salt compound such as used in the other embodiments of the invention. The remaining squares 9 are then printed a basic color corresponding to the color of the anhydrous compound. The printed lines are employed because the anhydrous compound has a tendency to concentrate at its perimeter after it has been printed on the paper and this tends to outline it contrary to my desire to have the printed salt portions undiscernible from the printed ink portions which is necessary if "pure" contrast is to be the indicator as well as color contrast. It has been found that this can be prevented by encircling the anhydrous portions by an inked line and continuing the inked line pattern throughout the sheet. Fig. 4 shows the complete lack of contrast and Fig. 5 the contrasting, readily discernible cross which appears when the salt breaks as a result of humidity change.

Such inked lines could also be used to separate the basic color portion and anhydrous portion of the indicator paper shown in Fig. 3. While an inked outline of the letter shown in Fig. 2 and of the individual dots of the anhydrous portion of the half-tone process in Fig. 1 could be made, it would tend to distract from the contrast between the shading when the compound changed to its hydrated form because the indicating geometric pattern would always be visible at least in outline. In the Fig. 1 construction, however, this might be avoided by ink outlining each circle—ink or salt. Such perimetric concentration does not, however, present a problem if the circles or dots of the Fig. 1 construction are small enough.

Figure 6:
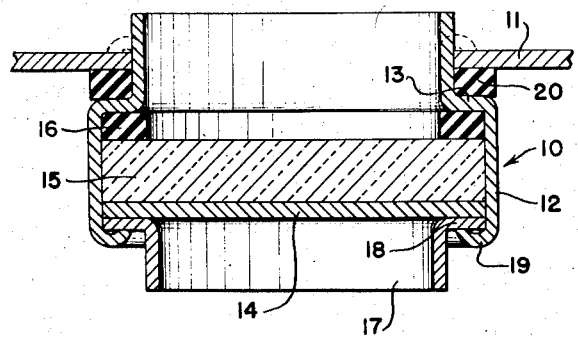
Fig. 6 is a side sectional view of a hygrometric indicator constructed according to my invention.

There is shown in Fig. 6 a sectional view of an indicator plug using an indicator paper which may be printed according to the forms described above. The plug 10 is adapted to fit into a sealed container 11 in which it is desired to know the relative humidity. The plug 10 has a tubular portion 12 which in turn has a shoulder 13 in its interior. Indicator paper 14 fits in the tube 12 and is protected by a sheet of glass 15. The sheet of glass 15 bears against a gasket 16 which in turn bears against shoulder 13. A second tube 17 is adapted to protect the sheet of paper 14. This tube has a flange 18 on one end which bears against the paper on one side and is engaged by the crimped portion 19 of the tube 12 on the other side. The indicator 10 is placed in the side of the container 11 by being inserted from the inside of the container to the outside. The indicator is held in place on the side of the container 11 by crimping a portion of the tube 12 outwards into contact with the container as shown by the dotted lines. A gasket 20 is placed between the container and the outside portion of the shoulder 13 so that the plug is in air-tight relationship with the container. The tubes 12 and 17 are made of a light metal which may be easily and economically formed.

While I have shown the filter paper 14 as being the same as that shown in Figs. 1 through 5, it is obvious that any type indicator paper could be used which was printed in any manner. Likewise, it is obvious that the particular indicator paper shown in Figs. 1 to 5 could be used in other plug structures than that shown in Fig. 6.

I claim:

1. A hygrometric indicator comprising a paper sheet zoned into a first area and a second area, said first area on said sheet having thereon a compound containing an anhydrous salt of a given color, said anhydrous salt on contact with a predetermined amount of moisture changing to a hydrated salt of a different color than that of said salt in its anhydrous form, and said second area on said sheet having printed thereon an ink having the same color as one of the colors of said salt.

2. A hygrometric indicator according to claim 1, wherein the printed areas of anhydrous salt compound and colored ink consist of a multiplicity of non-overlapping dots, each colored ink dot being separated from each anhydrous salt compound dot by an unprinted area of paper.

3. A hygrometric indicator comprising a paper sheet having printed directly upon its surface a shaded area and an adjacent area covered with a compound which changes shade at a predetermined relative humidity, the humidity being indicated by the contrast in the two shaded areas.

4. A hygrometric indicator comprising a substantially cylindrical structure which may be inserted as a hermetic plug in a corresponding hole in a container containing a gas of unknown relative humidity, said cylinder having a paper sheet part of the surface of which is permanently colored a certain shade and the remainder of the surface of which is printed with an anhydrous salt, said salt upon contact with a predetermined amount of moisture becoming hydrated and changing in color, said paper sheet being exposed to the gas in question through the end of the cylinder inside the container and exposed to view through the end of the cylinder outside the container, a glass being positioned as an air-tight seal between the paper sheet and the end of the cylinder outside the container.

5. A hygrometric indicator comprising a sheet of paper having printed thereon a network of inked lines enclosing a multiplicity of small areas on the paper, some of said areas having printed thereon a compound containing an anhydrous salt of a given color, said anhydrous salt upon contact with a predetermined amount of moisture changing to a hydrated form and having a different color than that of said salt in its anhydrous form, and the remaining number of said small areas having printed thereon an ink having the same color as one of the colors of said salt.

References Cited in the file of this patent

UNITED STATES PATENTS

| | | |
|---|---|---|
| 1,826,115 | Ziebarth | Oct. 6, 1931 |

FOREIGN PATENTS

| | | |
|---|---|---|
| 284,120 | Great Britain | Jan. 26, 1928 |
| 752,606 | France | July 24, 1933 |